United States Patent
Kwon et al.

(10) Patent No.: US 8,254,934 B2
(45) Date of Patent: Aug. 28, 2012

(54) PAGING METHOD AND APPARATUS THEREOF IN BROADBAND WIRELESS COMMUNICATION SYSTEM

(75) Inventors: Sung-Oh Kwon, Seoul (KR); Neung-Hyung Lee, Seoul (KR); Jong-In Kim, Seongnam-si (KR); Ho-Sun Youm, Seoul (KR); Kyeong-In Jeong, Hwaseong-si (KR); Jong-Hyung Kwun, Seongnam-si (KR); Ok-Seon Lee, Suwon-si (KR); Hwa-Jin Cha, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 321 days.

(21) Appl. No.: 12/510,612

(22) Filed: Jul. 28, 2009

(65) Prior Publication Data

US 2010/0041393 A1      Feb. 18, 2010

(30) Foreign Application Priority Data

Aug. 13, 2008   (KR) ........................ 10-2008-0079486

(51) Int. Cl.
*H04Q 7/20* (2006.01)

(52) U.S. Cl. ......... 455/437; 455/436; 455/458; 370/331
(58) Field of Classification Search .................. 455/437, 455/436, 458; 370/331
See application file for complete search history.

(56) References Cited

U.S. PATENT DOCUMENTS

| | | | |
|---|---|---|---|
| 2009/0042596 A1* | 2/2009 | Yavuz et al. .................. | 455/522 |
| 2009/0092097 A1* | 4/2009 | Nylander et al. ............. | 370/331 |
| 2009/0097448 A1* | 4/2009 | Vasudevan et al. .......... | 370/331 |
| 2009/0196266 A1* | 8/2009 | Wu et al. ....................... | 370/338 |

* cited by examiner

*Primary Examiner* — Danh Le (74) *Attorney, Agent, or Firm* — Jefferson IP Law, LLP (57) ABSTRACT

Provided are a paging method and an apparatus thereof for User Equipment (UE) in a broadband wireless communication system. In the method, a paging message is received from a macro base station. Whether there exists an accessible femto base station inside a service area of the macro base station is determined. When there does not exist the accessible femto base station inside the service area of the macro base station, the UE responds to the paging message of the macro base station. When there exists the accessible femto base station inside the service area of the macro base station, the UE waits for a paging message to be received from the femto base station.

10 Claims, 11 Drawing Sheets

PAGING METHOD AND APPARATUS THEREOF IN BROADBAND WIRELESS COMMUNICATION SYSTEM

PRIORITY

This application claims the benefit under 35 U.S.C. §119(a) of a Korean patent application filed in the Korean Intellectual Property Office on Aug. 13, 2008 and assigned Serial No. 10-2008-0079486, the entire disclosure of which is hereby incorporated by reference.

BACKGROUND OF THE INVENTION

1. Field of the Invention

The present invention relates to a paging method and an apparatus thereof in a broadband wireless communication system. More particularly, the present invention relates to a paging method and an apparatus thereof of User Equipment (UE) located within a service area of a femto cell.

2. Description of the Related Art

In a cellular wireless communication system, a channel may deteriorate due to one or more of a geographical factor inside a cell, a distance between User Equipment (UE) and a base station, and movement of the UE, so that communication between the UE and the base station is hampered. More particularly, when a UE is located inside a closed building such as an office or a household, a channel between a base station and the UE may deteriorate in a region referred to as a shadow region. The UE located in the shadow region has difficulty in communicating with the base station.

A femto cell concept is proposed in order to provide a data service of a far higher level to even more users while addressing a service limitation of the indoor shadow region. The femto cell is a small cell service area formed by a femto base station (femto eNB or home dNB) which accesses a mobile communication core network via a broadband network installed in the indoor space. Since the femto cell has a very small cell service area compared to a macro cell, a plurality of femto cells may be installed inside one macro cell service area.

A macro base station may experience interference from a plurality of femto cells existing inside a cell service area of the macro base station. Therefore, to reduce an amount of interference by a femto base station to a macro base station, there is a conventional technique for turning off transmitter power of a femto base station that is not currently providing service to a UE.

Further, there is a conventional technique for allowing a UE to camp on a macro base station instead of a relevant femto base station, to increase efficiency when the UE exists inside the service area of the femto base station in the case where the technique for turning off transmitter power of the femto base station is used. That is, there is a technique for allowing an idle UE to receive a paging message from the macro base station by allowing the UE located inside the service area of the femto base station to camp on the macro base station.

However, when the UE located inside the service area of the femto base station camps on the macro base station, when an incoming call for the UE occurs, the UE that has been transmitting/receiving data via the macro base station performs an active handover to the femto base station, that is, performs a hand-in to transmit/receive data occasionally.

Figure 1:
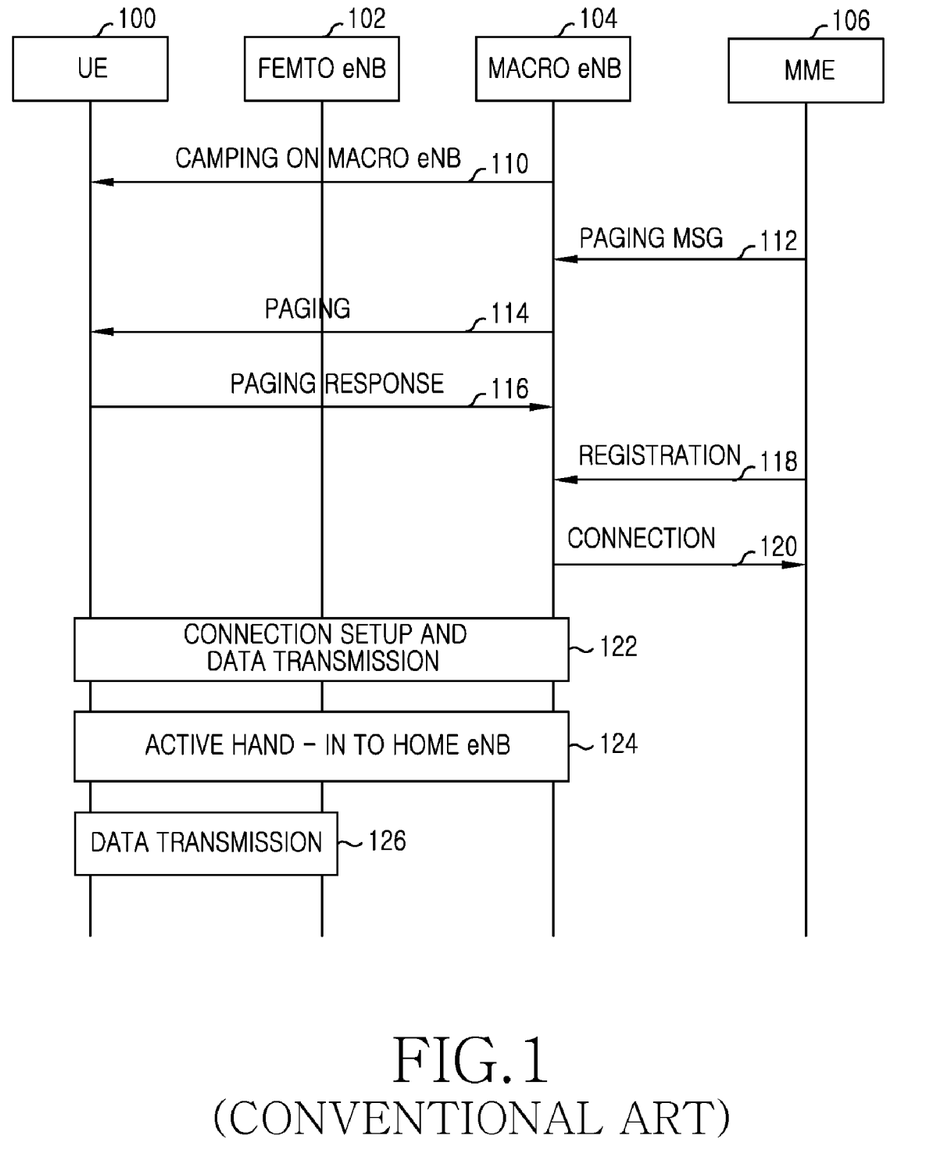
FIG. 1 is a view illustrating a paging technique of User Equipment (UE) located in a femto cell in a conventional broadband wireless communication system.

FIG. 1 is a view illustrating a paging technique of a UE located in a femto cell in a conventional broadband wireless communication.

Referring to FIG. 1, in step 110, a UE 100 located in the service area of a femto base station (femto eNB) 102 camps on a macro base station (macro eNB) 104. When an incoming call for the UE 100 occurs, a Mobility Management Entity (MME) 106 transmits a paging message to the macro base station 104 in step 112. In step 114, the macro base station 104 performs paging for the UE 100. In step 116, the UE 100 transmits a response message to the paging for the macro base station 104. In step 118, the macro base station that has received the response message transmits a registration message to the MME 106. In step 120, the MME 106 connects the incoming call to the macro base station 104.

In step 122, the macro base station 104 and the UE 100 sets up a connection and transmit/receive data. At this point, when detecting the femto base station 102, the UE 100 performs an active handover to the femto base station 102, i.e., a hand-in in step 124, and transmits/receives data via the femto base station 102 in step 126.

As described above, according to the conventional art, even when a UE is located in the service area of a femto base station, the UE camps on a macro base station and receives a paging message from the macro base station, so that the UE starts to transmit/receive data via the macro base station. However, frequently, since the UE is located in the service area of the femto base station, the UE may detect the femto base station while transmitting/receiving data, and perform an active hand-in to the detected femto base station. Here, the active hand-in is one of a plurality of handover techniques causing a burden to a system. Since the active hand-in occurs frequently, the load on the system increases.

SUMMARY OF THE INVENTION

An aspect of the present invention is to address at least the above-mentioned problems and/or disadvantages and to provide at least the advantages described below. Accordingly, an aspect of the present invention is to provide a paging method and an apparatus thereof in a broadband wireless communication system.

Another aspect of the present invention is to provide an efficient method and an apparatus thereof for idle User Equipment (UE), which is located in a service area of a femto base station and which is camping on a macro base station in a broadband wireless communication system.

Still another aspect of the present invention is to provide a method and an apparatus for allowing an idle UE, which is located in a cell service area of a femto base station and which is camping on a macro base station, to access the cell service area of the femto base station without performing a hand-in procedure in a broadband wireless communication system.

In accordance with an aspect of the present invention, a paging method for a UE in a broadband wireless communication system is provided. The method includes receiving a paging message from a macro base station, determining whether there exists an accessible femto base station inside a service area of the macro base station, when there does not exist the accessible femto base station inside the service area of the macro base station, responding to the paging message of the macro base station, and when there exists the accessible femto base station inside the service area of the macro base station, waiting for a paging message to be received from the femto base station.

In accordance with another aspect of the present invention, a paging apparatus for a UE in a broadband wireless communication system is provided. The apparatus includes a transceiver for receiving a paging message from a macro base station, and a controller for, when there does not exist an accessible femto base station inside a service area of the macro base station, responding to the paging message of the macro base station, and when there exists the accessible femto base station inside the service area of the macro base station, waiting for a paging message to be received from the femto base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for allowing User Equipment (UE) in an idle state, which is located in a femto cell and which is camping on a macro base station, to receive paging messages from the macro base station and a relevant femto base station, and perform a paging response to one of the two base stations depending on circumstances. Here, the idle state denotes a state in which the UE receives only a Broadcast Control Channel (BCCH) and a Packet Control Channel (PCCH) of a base station without performing data transmission/reception to/from the base station. The information of the idle UE is not stored in any base station. However, since the UE performs Tracking Area (TA) update when moving on the TA, a Mobility Management Entity (MME) stores TA information of the UE.

A paging method of a UE located in a femto cell is described with reference to FIGS. 2 to 4. Here, description will be made for a case in which an idle UE 200 which is camping on a macro base station 204 enters the service area of a femto base station 202 existing inside the service area of the macro base station 204, performs cell reselection and TA update, and then camps again on the macro base station 204.

Figure 2:
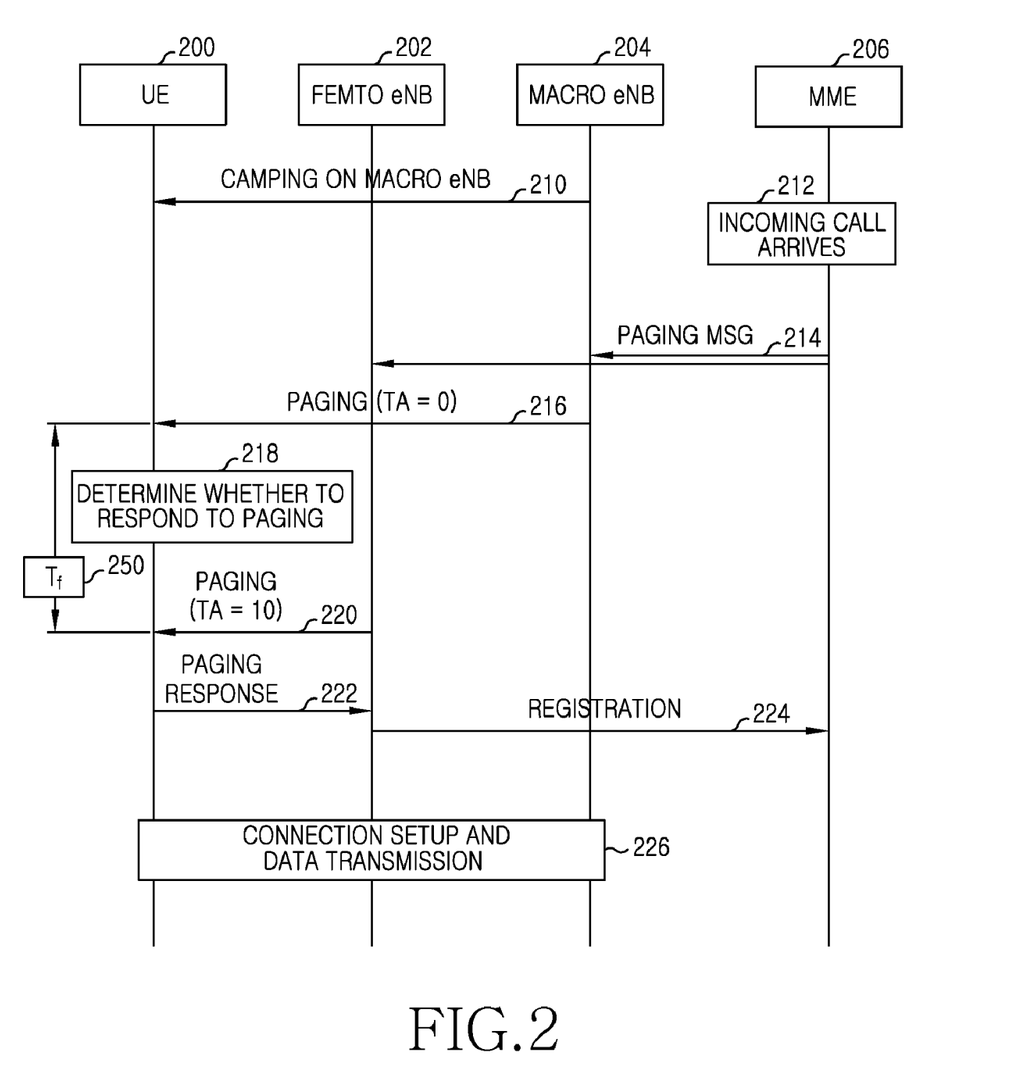
FIG. 2 is a view illustrating a paging technique of a UE located in a femto cell in a broadband wireless communication system according to an exemplary embodiment of the present invention.

FIG. 2 is a view illustrating a paging technique of a UE located in a femto cell in a broadband wireless communication system according to an exemplary embodiment of the present invention.

Referring to FIG. 2, in step 210, the UE 200 receives a BCCH from the macro base station (macro eNB) 204 to camp on the macro base station 204. At this point, the UE 200 may detect whether there exists a femto base station (femto eNB) 202.

In step 212, when an incoming call arrives from a different MME, an MME 206 determines on which macro base station 204 the UE 200 corresponding to the incoming call is camping, and determines on which femto base station 202 the UE 200 has previously camped within a predefined time from femto base stations associated with the macro base station 204, and in step 214, the MME 206 transmits paging messages to the macro base station 204 and the femto base station 202, respectively.

In step 216, the macro base station 204 transmits a paging message to the UE 200, and in step 218, the UE 200 determines whether to respond to the paging message received from the macro base station 204. That is, the UE 200 determines whether to respond to the paging message from the macro base station 204, or whether to defer a paging response to the macro base station 204, and wait for a paging message to be received from the femto base station 202 and respond to the paging message of the femto base station 202.

When determining to respond to the femto base station 202, the UE 200 waits for a paging message to be received from the femto base station 202 for a threshold time $T_f$ 250. At this point, the threshold time $T_f$ 250 is measured from a point at which the paging message is received from the macro base station 204. Here, though not shown, when determining to respond to the macro base station 204, the UE 200 immediately transmits a paging response message to the macro base station 204 to transmit/receive data via the macro base station 204.

In step 220, when a paging message is received from the MME 206, the femto base station 202 transmits a paging message to the UE 200. Here, when the paging message is received, the femto base station 202 may stand by for a predefined time and then transmit the paging message to the UE 200.

In step 222, when the paging message is received from the femto base station 202 within the threshold time $T_f$ 250, the UE 200 transmits a paging response message to the femto base station 202.

In step 224, the femto base station 202 that has received the paging response message transmits a registration message to the MME 206 to receive the incoming call from the MME 206, and in step 226, the UE 200 and the femto base station 204 set up a connection and transmit/receive data.

Hereinafter, a case in which the UE 200 cannot receive a paging message from the femto base station 202 within the threshold time Tf 250 will be described with reference to FIGS. 3 and 4.

Figure 3:
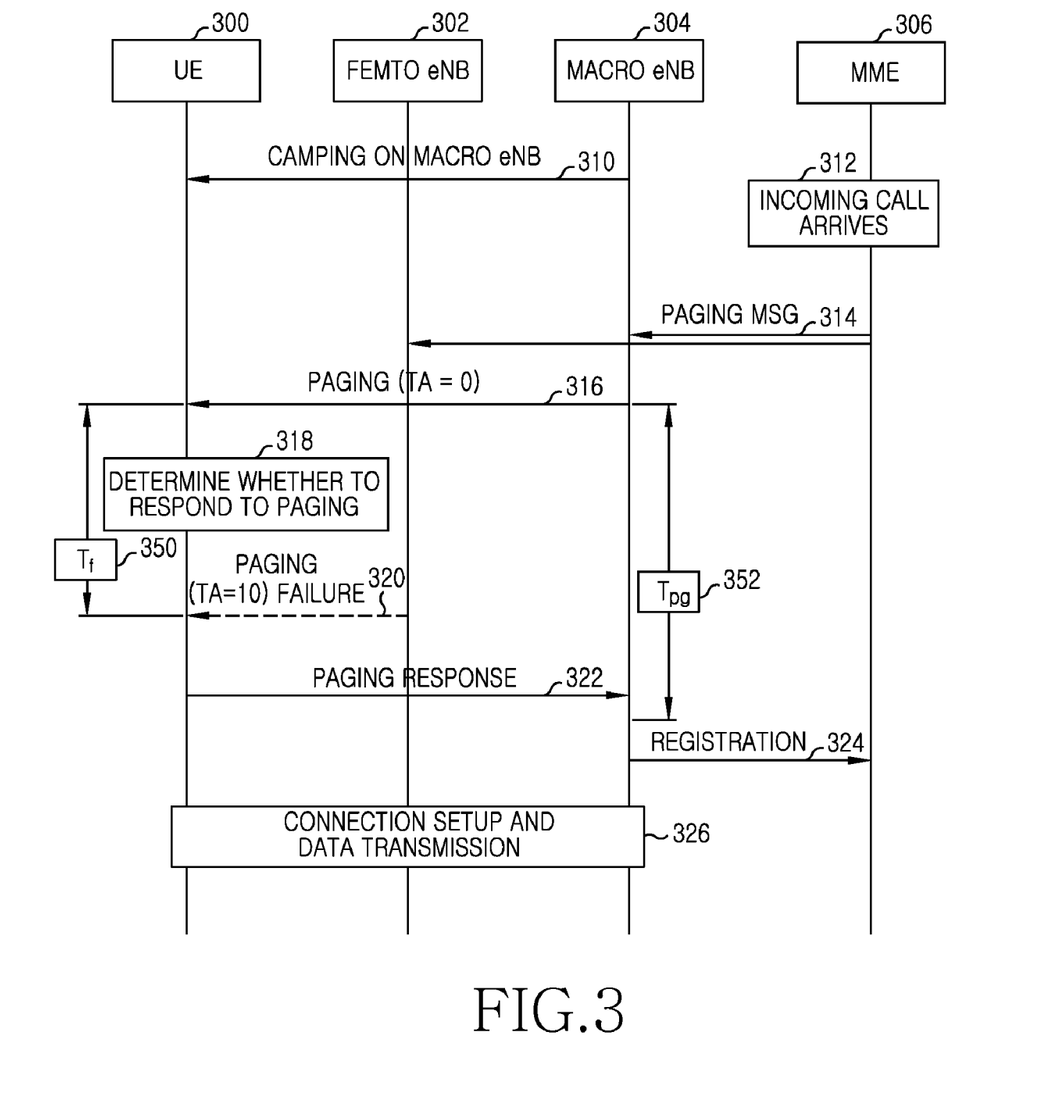
FIG. 3 is a view illustrating a paging technique of a UE located in a femto cell in a broadband wireless communication system according to an exemplary embodiment of the present invention.

FIG. 3 is a view illustrating a paging technique of a UE located in a femto cell in a broadband wireless communication system according to an exemplary embodiment of the present invention. As illustrated in FIG. 3, since steps 310 to 316 of FIG. 3 are the same as steps 210 to 216 of FIG. 2, descriptions thereof are omitted.

Referring to FIG. 3, when a UE 300 determines to respond to a femto base station 302 as a result of a determination in step 318 as to whether to respond to a paging message received from a macro base station 304, the UE 300 waits for a paging message to be received from the femto base station 302 for a threshold time $T_f$ 350. Here, the threshold time $T_f$ 350 is measured from a point at which the paging message is received from the macro base station 304.

When a paging message is not received from the femto base station 302 within the threshold time $T_f$ 350, i.e., when the femto base station 302 has transmitted the paging message in step 320 but the UE 300 could not receive the paging message within the threshold time $T_f$ 350, the UE 300 transmits a paging response message to the macro base station 304 in step 322.

Next, when the paging response message is received within a threshold time $T_{pg}$ 352 since a point at which the paging message has been transmitted, the macro base station 404 transmits a registration message to an MME 306 in step 324 to receive an incoming call from the MME 306. Here, the threshold $T_f$ 350 denotes a duration for waiting for the paging message of the femto base station 302 and is smaller than the threshold time $T_{pg}$ 352, which denotes a duration for waiting for, at the macro base station, the paging response message of the UE 300.

Next, in step 326, the UE 300 and the macro base station 304 set up a connection to transmit/receive data.

Figure 4:
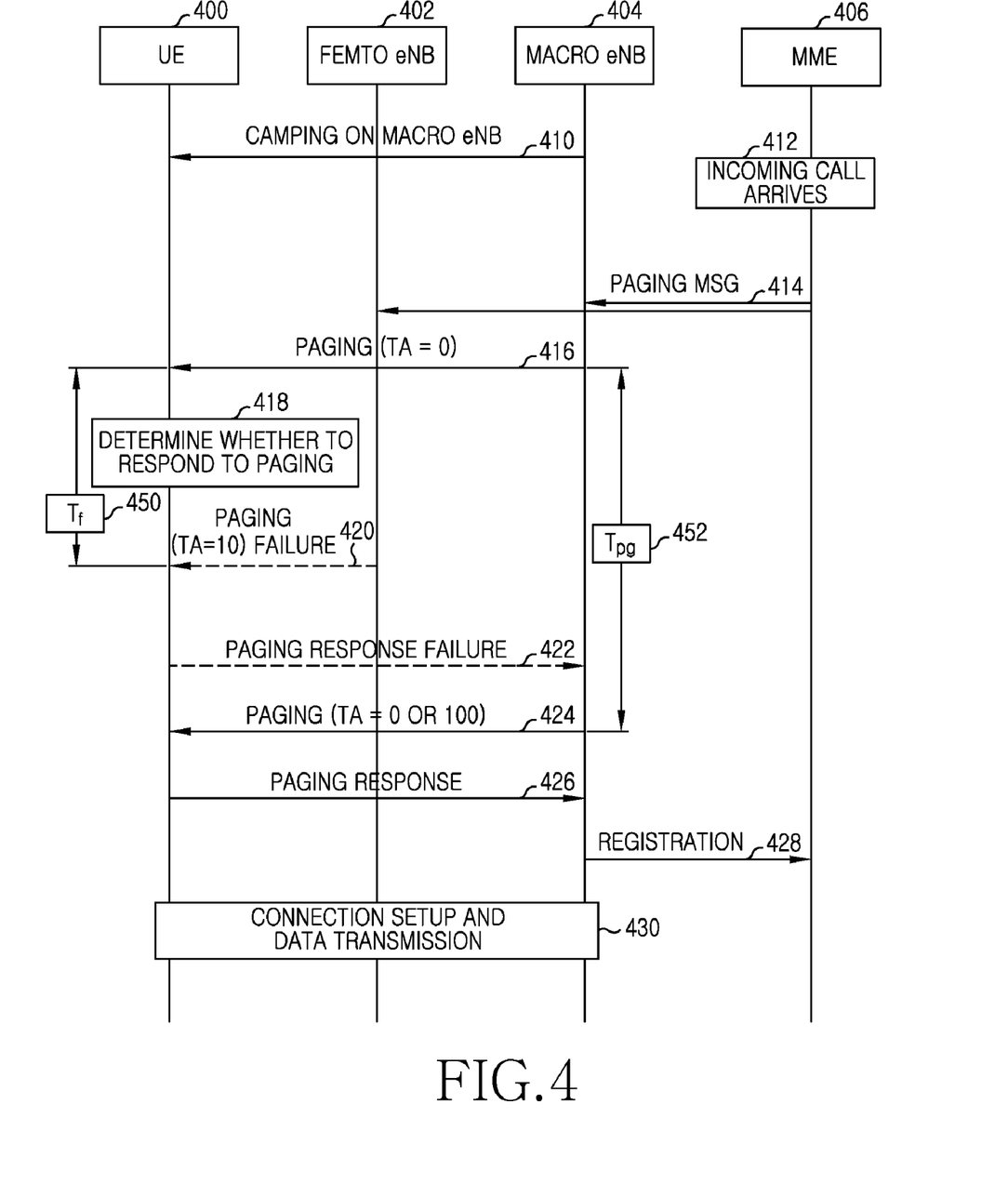
FIG. 4 is a view illustrating a paging technique of a UE located in a femto cell in a broadband wireless communication system according to an exemplary embodiment of the present invention.

FIG. 4 is a view illustrating a paging technique of a UE located in a femto cell in a broadband wireless communication system according to an exemplary embodiment of the present invention. As illustrated in FIG. 4, since steps 410 to 416 of FIG. 4 are the same as steps 210 to 216 of FIG. 2, descriptions thereof are omitted.

Referring to FIG. 4, when a UE 400 determines to respond to a femto base station 402 as a result of a determination in step 418 as to whether to respond to a paging message received from a macro base station 404, the UE 400 waits for a paging message to be received from the femto base station 402 for a threshold time $T_f$ 450. Here, the threshold time $T_f$ 450 is measured from a point at which the paging message is received from the macro base station 404.

When the UE 400 cannot receive a paging message from the femto base station 402 within the threshold time $T_f$ 450, i.e., when the femto base station 402 has transmitted the paging message in step 420 but the UE 400 could not receive the paging message within the threshold time $T_f$ 450, the UE 400 transmits a paging response message to the macro base station 404 in step 422.

However, when the paging response message is not received in the macro base station 404 within a threshold time $T_{pg}$ 452 since a point at which the paging message has been transmitted, the macro base station 404 re-transmits a paging message to the UE 400 after the threshold time $T_{pg}$ 452 expires in step 424. At this point, the macro base station may maintain or change a TA and re-transmit a paging message. This is to prepare for a circumstance where a service area in which the UE 400 is located changes due to movement of the UE 400 and so the UE 400 cannot receive a paging message. Here, the threshold time $T_f$ 450 denotes a duration for waiting for a paging message of the femto base station and is smaller than the threshold time $T_{pg}$ 452, which denotes a duration for waiting for, at the macro base station, the paging response message of the UE 400.

Next, the UE 400 that has again received the paging message from the macro base station 404 immediately transmits a paging response message to the macro base station 404 in step 426, and the macro base station 404 that has received the paging response message transmits a registration message to an MME 406 to receive an incoming call in step 428.

Next, the UE 400 and the macro base station 404 set up a connection to transmit/receive data in step 430.

Figure 5:
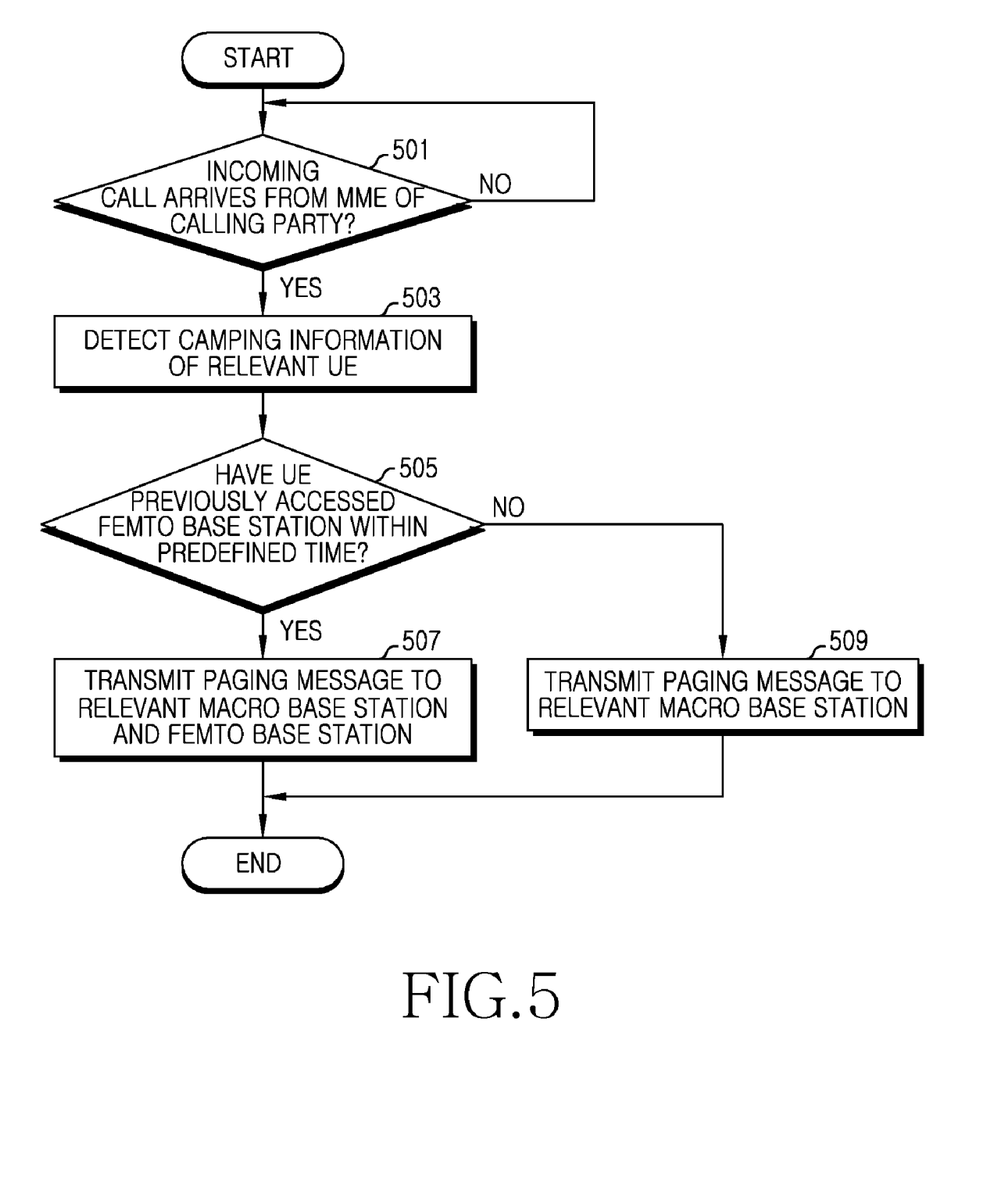
FIG. 5 is a flowchart illustrating an operation procedure of a Mobility Management Entity (MME) in a broadband wireless communication system according to an exemplary embodiment of the present invention.

FIG. 5 is a flowchart illustrating an operation procedure of an MME in a broadband wireless communication system according to an exemplary embodiment of the present invention.

Referring to FIG. 5, when an incoming call arrives from a different MME in step 501, an MME detects camping information of a relevant UE in step 503. That is, the MME determines on which macro base station the UE is camping, and determines whether the UE has previously camped on a femto base station belonging to the macro base station within a predefined time.

In step 505, the MME determines whether the UE has previously camped on the femto base station within a predefined time through the camping information. When the UE has previously camped on the femto base station, the MME transmits paging messages to the macro base station on which the UE is camping and the femto base station on which the UE has previously camped in step 507, and then ends the operation according to an exemplary embodiment of the present invention.

On the other hand, when the UE has not previously camped on the femto base station within the predefined time, the UE transmits a paging message to only the macro base station on which the UE is camping in step 509, and then ends the operation according to an exemplary embodiment of the present invention.

Figure 6:
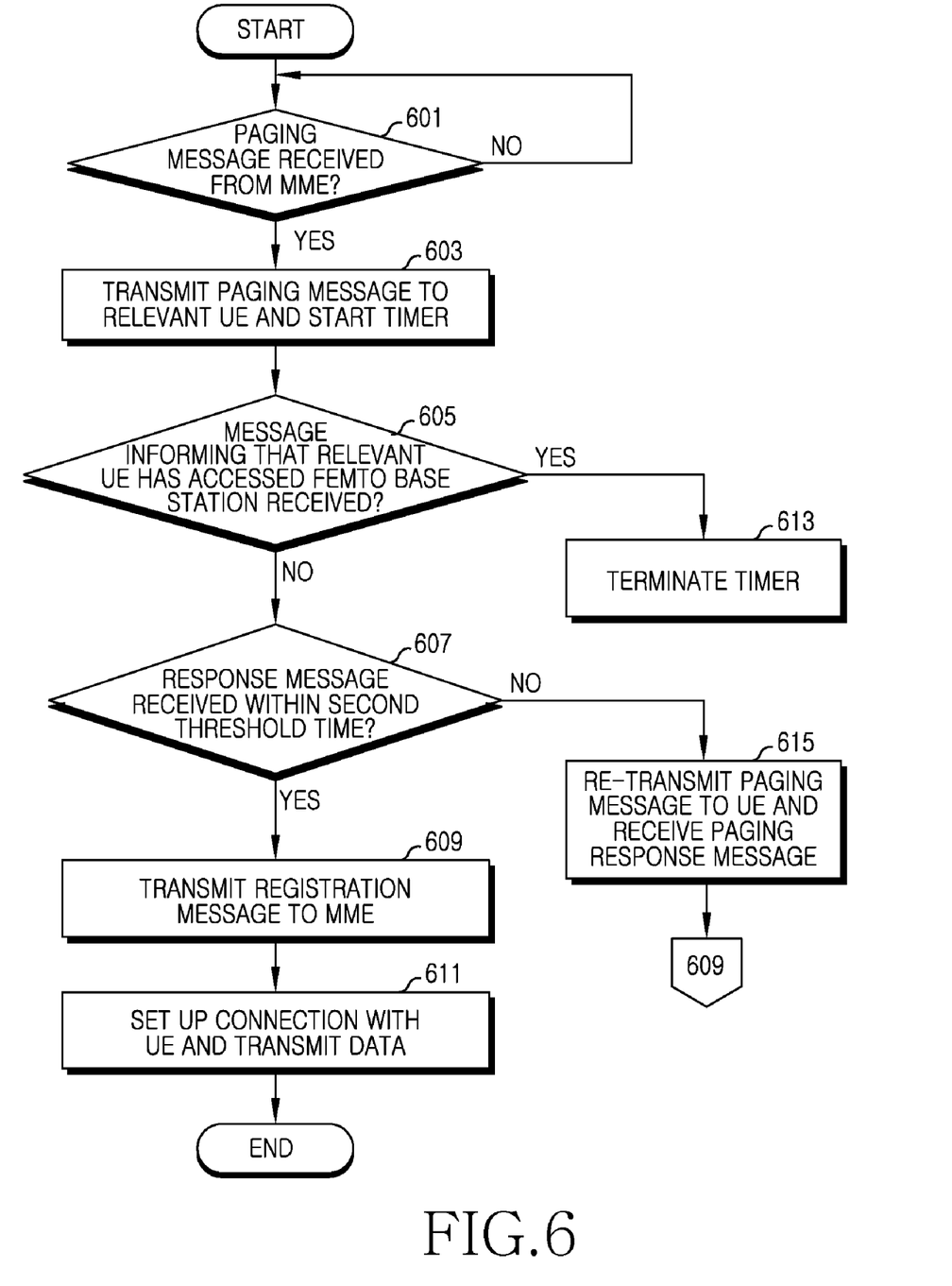
FIG. 6 is a flowchart illustrating an operation procedure of a macro base station in a broadband wireless communication system according to an exemplary embodiment of the present invention.

FIG. 6 is a flowchart an operation procedure of a macro base station in a broadband wireless communication system according to an exemplary embodiment of the present invention.

Referring to FIG. 6, when a paging message is received from an MME in step 601, the macro base station transmits a paging message to a relevant UE and starts a timer to measure a time in step 603.

In step 605, the macro base station determines whether a message informing that the relevant UE has accessed a femto base station is received from the MME or the femto base station. When the message informing that the relevant UE has accessed the femto base station is received, the macro base station terminates the timer and ends the operation according to an exemplary embodiment of the present invention in step 613.

On the other hand, when the message informing that the relevant UE has accessed the femto base station is not received, the macro base station determines whether a paging response message is received from the relevant UE within a second threshold time in step 607. Here, the second threshold time is a time for allowing the macro base station to re-transmit a paging message to the relevant UE.

When the paging response message is received from the relevant UE within the second threshold time, the macro base station transmits a registration message to the MME to receive an incoming call in step 609, sets up a connection with the relevant UE to transmit/receive data in step 611, and ends the operation according to an exemplary embodiment of the present invention.

On the other hand, when the paging response message is not received from the relevant UE within the second threshold time, the macro base station re-transmits a paging message to the relevant UE and receives a response message thereto in step 615, and proceeds to step 609.

Figure 7:
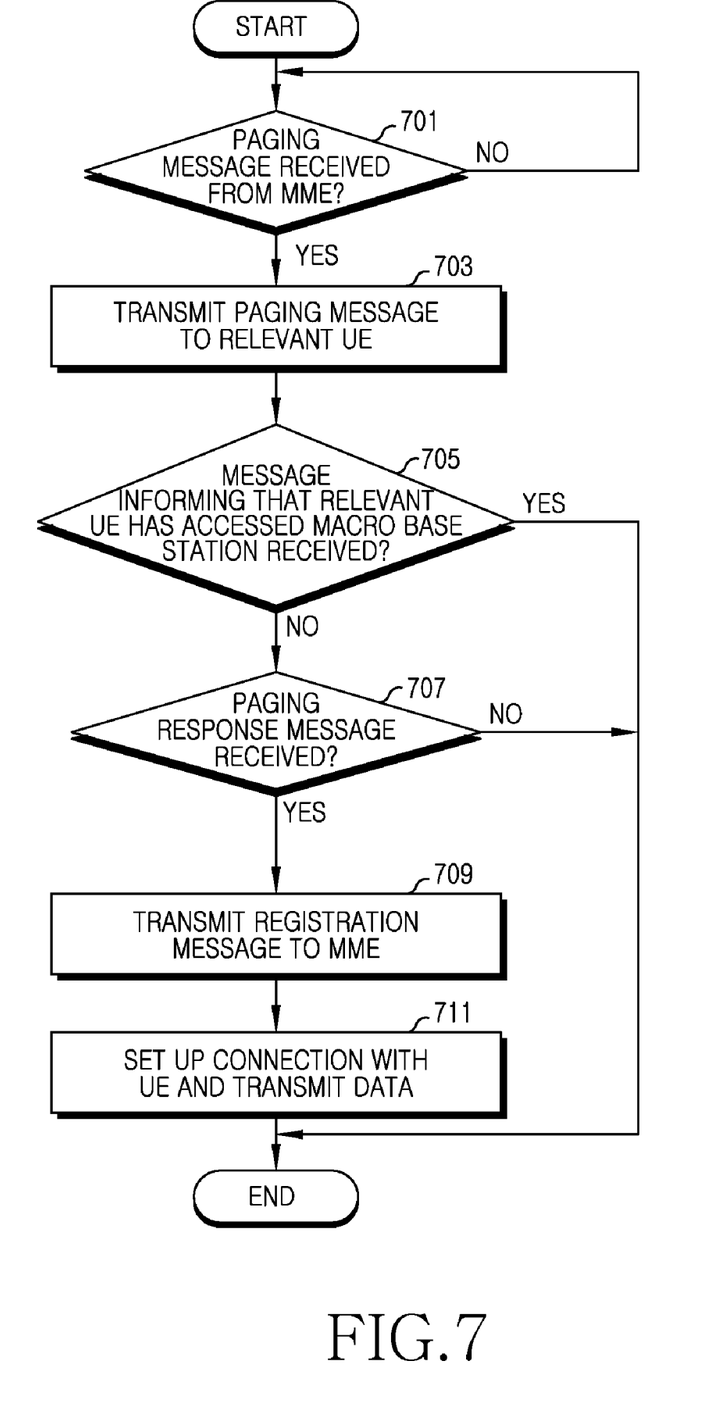
FIG. 7 is a flowchart illustrating an operation procedure of a femto base station in a broadband wireless communication system according to an exemplary embodiment of the present invention.

FIG. 7 is a flowchart illustrating an operation procedure of a femto base station in a broadband wireless communication system according to an exemplary embodiment of the present invention.

Referring to FIG. 7, when a paging message is received from an MME in step 701, the femto base station transmits a paging message to a relevant UE in step 703.

In step 705, the femto base station checks whether a message informing that the UE accesses a macro base station is received from the MME or the macro base station to which the femto base station is associated. When the message informing that the UE accesses the macro base station is received, the femto base station ends the operation according to an exemplary embodiment of the present invention.

On the other hand, when the message informing that the UE accesses the macro base station is not received, the femto base station determines whether a paging response message is received from the relevant UE in step 707. When the paging response message is not received from the relevant UE, the femto base station ends the algorithm according to an exemplary embodiment of the present invention.

On the other hand, when the paging response message is received from the relevant UE, the femto base station transmits a registration message to the MME to receive an incoming call in step 709, sets up a connection with the relevant UE to transmit/receive data in step 711, and ends the operation according to an exemplary embodiment of the present invention.

Figure 8:
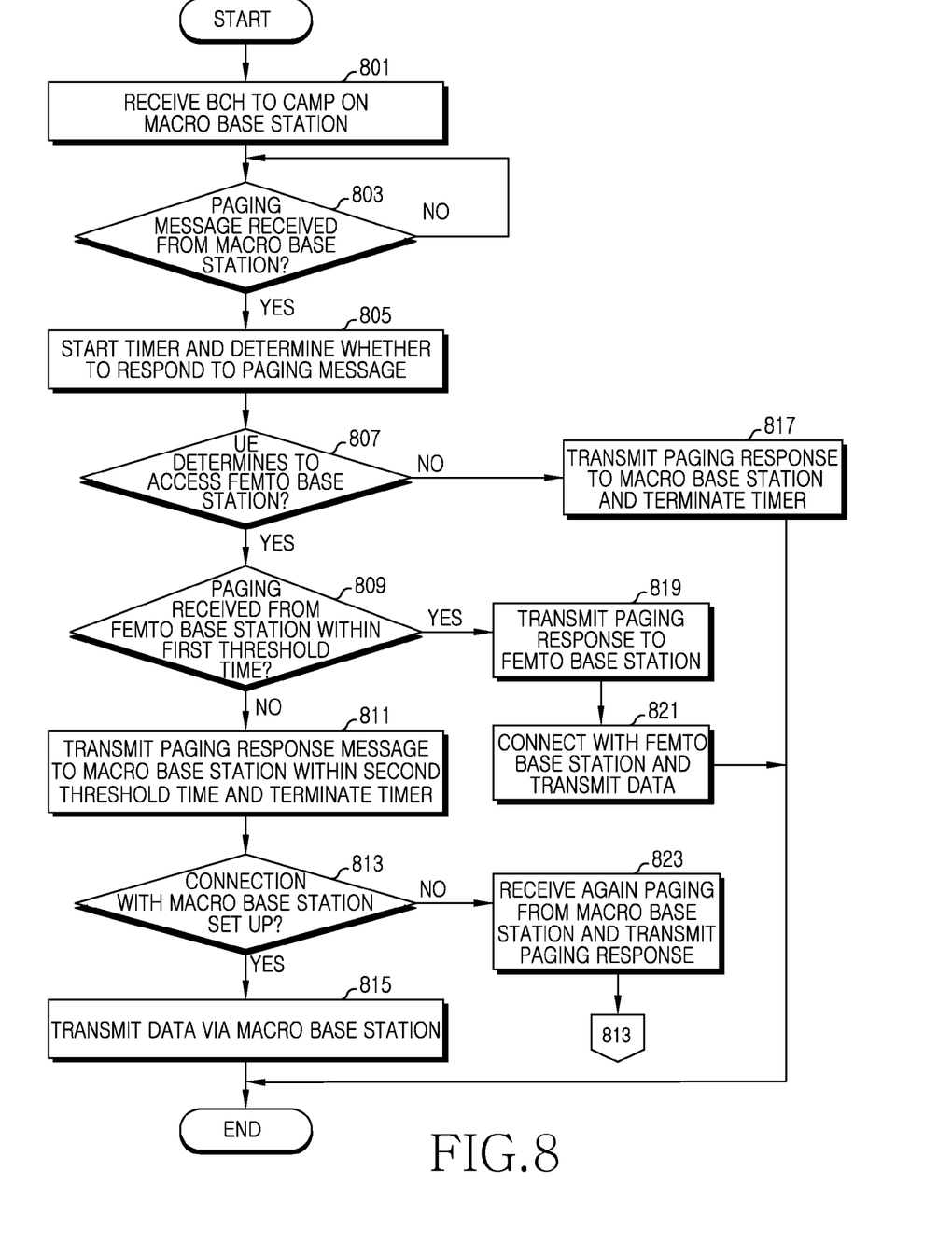
FIG. 8 is a flowchart illustrating an operation procedure of a UE in a broadband wireless communication system according to an exemplary embodiment of the present invention.

FIG. 8 is a flowchart illustrating an operation procedure of a UE in a broadband wireless communication system according to an exemplary embodiment of the present invention.

Referring to FIG. 8, in step 801, the UE receives a BCCH from a macro base station to camp on the macro base station, and in step 803, determines whether a paging message is received from the macro base station. Here, the UE may detect whether there exists a femto base station while camping on the macro base station.

When the paging message is received, the UE starts a timer to measure a time and determines whether to respond to the paging message received from the macro base station in step 805. That is, the UE determines whether to access the macro base station in response to the paging message from the macro base station, or whether to defer a paging response to the macro base station and wait for a paging message to be received from the femto base station and access the femto base station in response to the paging message from the femto base station. Here, the determining of whether to respond to the paging message received from the macro base station will be described below in more detail with reference to FIG. 9.

In step 807, the UE determines whether to access the femto base station as a result of a determination as to whether to respond to the paging message. When determining to access the macro base station instead of determining to access the femto base station, the UE proceeds to step 817 to transmit a paging response message to the macro base station, terminates the timer, and then ends the operation according to an exemplary embodiment of the present invention.

On the other hand, when determining to access the femto base station, the UE determines whether a paging message is received from the femto base station within a predefined first threshold time in step 809. When the paging message is received from the femto base station within the predefined first threshold time, the UE transmits a paging response message to the femto base station in step 819, sets up a connection with the femto base station to transmit/receive data in step 821, and ends the operation according to an exemplary embodiment of the present invention.

On the other hand, when the paging message is not received from the femto base station within the predefined first threshold time, the UE transmits a paging response message to the macro base station before a predefined second threshold time expires and terminates the timer in step 811. Here, the second threshold time is a time for which the macro base station stands by in order to receive the paging response message, and is greater than the first threshold time.

In step 813, the UE determines whether a connection with the macro base station is set up. When the connection with the macro base station is not set up, in step 823, the UE receives again a paging message from the macro base station, immediately transmits a paging response message thereof, and returns to step 813. Here, the reason the connection with the macro base station has not been set up is because the macro base station was not able to successfully receive the paging response message transmitted by the UE within the second threshold time.

When the connection with the macro base station is set up, the UE transmits/receives data via the macro base station in step 815, and ends the operation according to an exemplary embodiment of the present invention.

Figure 9:
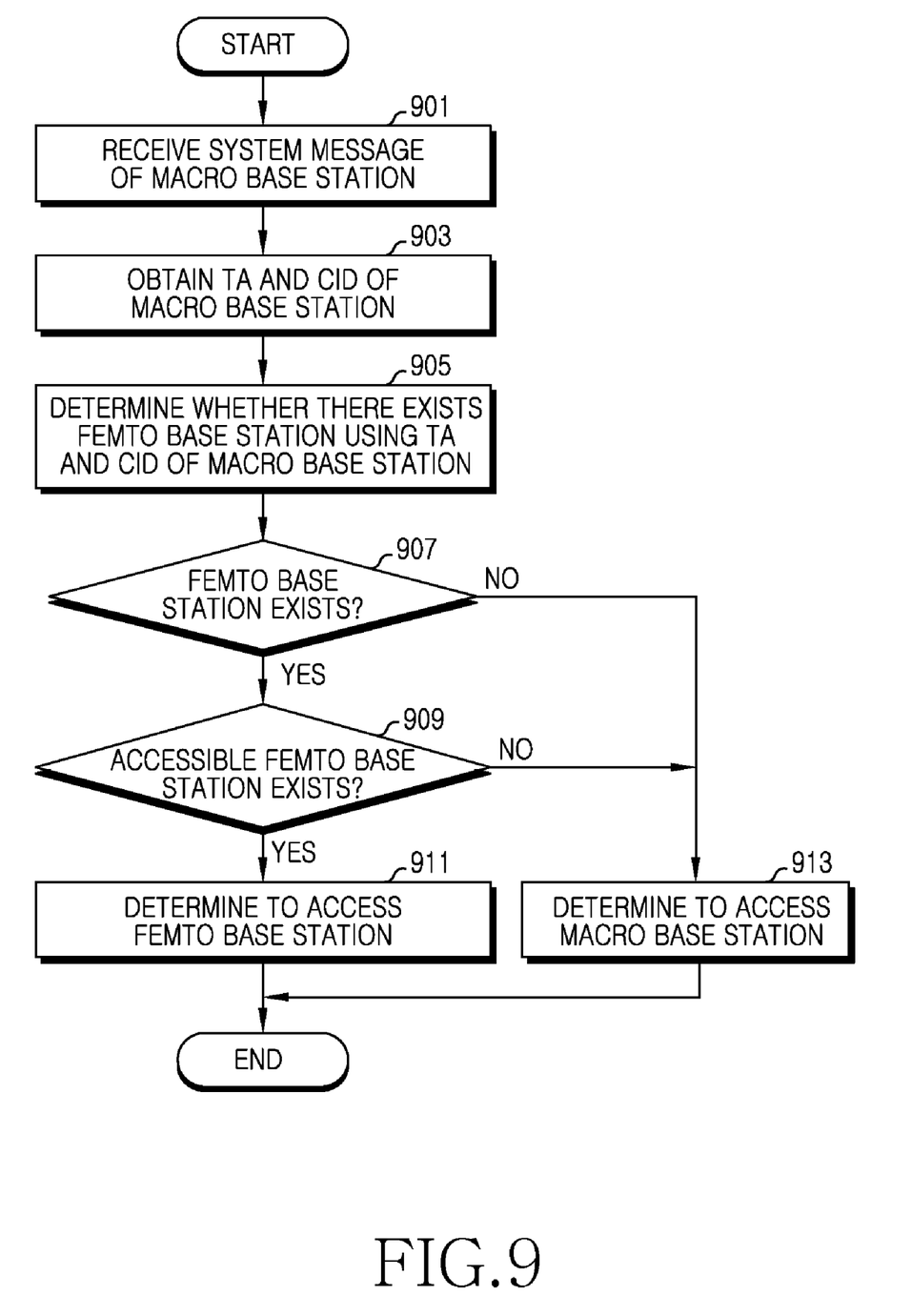
FIG. 9 is a flowchart illustrating an operation procedure of a UE that determines a paging response base station in a broadband wireless communication system according to an exemplary embodiment of the present invention.

FIG. 9 is a flowchart illustrating an operation procedure of a UE that determines a paging response base station in a broadband wireless communication system according to an exemplary embodiment of the present invention.

Referring to FIG. 9, in step 901, the UE receives a system message of a macro base station, and in step 903, obtains a TA and a Connection IDentifier (CID) of the macro base station from the received system message.

In step 905, the UE determines whether there exists a femto base station inside the service area of the macro base station by comparing the TA and the CID of the macro base station with a fingerprint or footprint stored in advance. Here, the fingerprint or footprint denotes a set of femto base stations which may be accessed by the UE, that is, information of the macro base station including a Closed Subscriber Group (CSG).

When determining there does not exist a femto base station inside the service area of the macro base station as a result of the determination in step 907, the UE determines to access the macro base station in step 913, and ends the operation according to an exemplary embodiment of the present invention.

On the other hand, when determining there exists a femto base station inside the service area of the macro base station as a result of the determination in step 907, the UE determines whether there exists a femto base station accessible by the UE among femto base stations existing inside the service area of the macro base station. When there does not exist a femto base station accessible by the UE, the UE determines to access the macro base station in step 913, and ends the operation according to an exemplary embodiment of the present invention.

On the other hand, when there exists a femto base station accessible by the UE, the UE determines to access the femto base station in step 911, and ends the operation according to an exemplary embodiment of the present invention.

Figure 10:
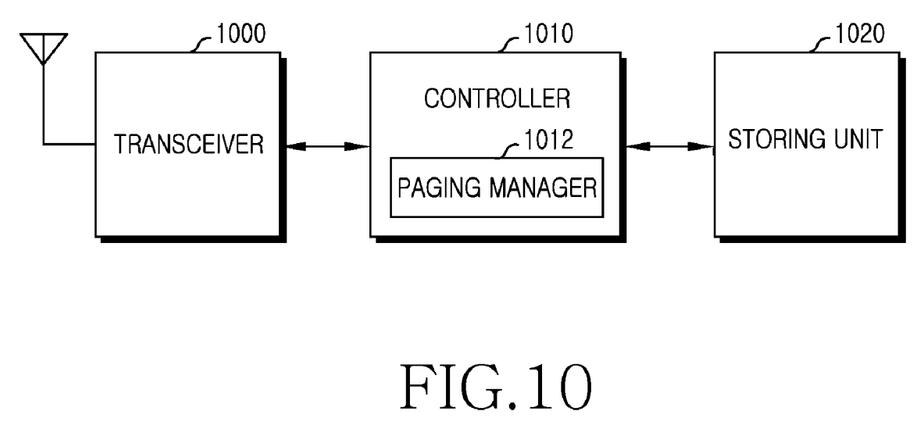
FIG. 10 is a block diagram illustrating an MME in a broadband wireless communication system according to an exemplary embodiment of the present invention.

FIG. 10 is a block diagram illustrating an MME in a broadband wireless communication system according to an exemplary embodiment of the present invention.

Referring to FIG. 10, the MME includes a transceiver 1000, a controller 1010, and a storing unit 1020. More particularly, the controller 1010 includes a paging manager 1012.

The transceiver 1000 transmits/receives a signal to/from a different MME, a macro base station, or a femto base station under control of the controller 1010. More particularly, according to an exemplary embodiment of the present invention, the transceiver 1000 transmits a paging message for a specific UE to the macro base station or the femto base station under control of the controller 1010.

The controller 1010 controls and processes overall operations of the MME, and more particularly, includes the paging manager 1012 according to an exemplary embodiment of the present invention. Accordingly, when an incoming call arrives from a different MME via the transceiver 1000, the controller 1010 detects information of a relevant UE to determine a base station to which a paging message is to be transmitted. That is, the paging manager 1012 determines on which macro base station the UE is camping through information of the UE stored in the storing unit 1020, and determines whether the UE has previously camped on a femto base station belonging to the macro base station for a predefined time. When the UE has previously camped on the femto base station, the UE determines to transmit paging messages to the macro base station and the femto base station on which the UE has previously camped, respectively. When the UE has not previously camped on the femto base station, the UE determines to transmit a paging message to only the macro base station.

The storing unit 1020 stores various programs and data for overall operations of the MME, and stores camping information and TA information of each UE.

Figure 11:
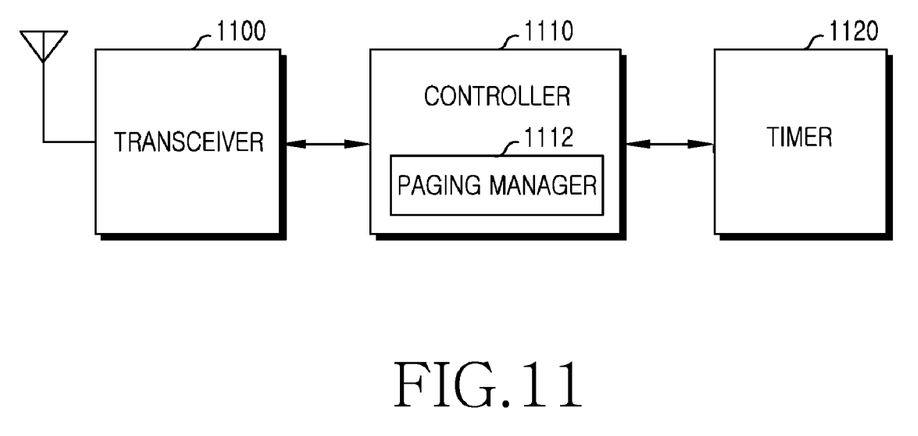
FIG. 11 is a block diagram illustrating a macro base station in a broadband wireless communication system according to an exemplary embodiment of the present invention.

FIG. 11 is a block diagram illustrating a macro base station in a broadband wireless communication system according to an exemplary embodiment of the present invention.

Referring to FIG. 11, the macro base station includes a transceiver 1100, a controller 1110, and a timer 1120. More particularly, the controller 1110 includes a paging manager 1112.

The transceiver 1100 transmits/receives a signal to/from a different MME, a femto base station, or a UE under control of the controller 1110. More particularly, the transceiver 1100 receives a paging message from the MME to provide the paging message to the controller 1110, transmits a paging message to a specific UE under control of the controller 1110, and receives a paging response message from the specific UE.

The controller 1110 controls and processes overall operations of the macro base station, and more particularly, includes the paging manager 1112 according to an exemplary embodiment of the present invention. Accordingly, when a paging message is received from an MME via the transceiver 1100, the controller 1110 manages paging for a relevant UE. That is, the paging manager 1112 transmits a paging message to the relevant UE, starts the timer 1120 to determine whether a paging response message is received from the UE within a predefined second threshold time $T_{pg}$, or whether a messaging informing that the UE has accessed a femto base station is received from the MME or the femto base station, and determines whether to re-transmit a paging message to the relevant UE. When a paging response message is received from the UE, the paging manager 1112 transmits a registration message to the MME to receive an incoming call, and sets up a connection with the UE to control and process a function for transmitting/receiving data. When a message informing that the UE has accessed a femto base station is received, the paging manager 1112 ends a paging procedure for the UE.

The timer 1120 starts its operation under control of the controller 1110 to measure a predefined second threshold time $T_{pg}$.

Figure 12:
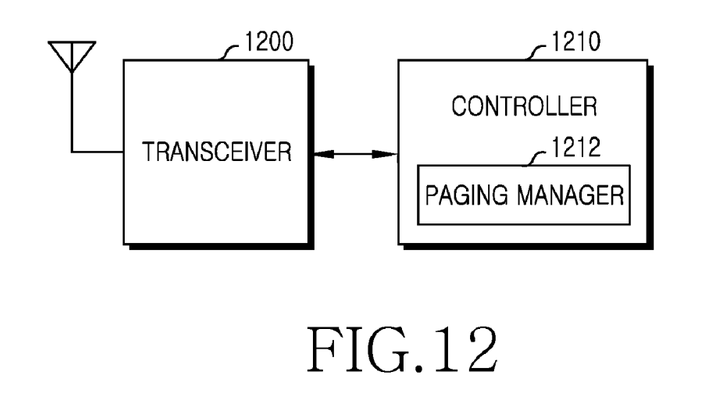
FIG. 12 is a block diagram illustrating a femto base station in a broadband wireless communication system according to an exemplary embodiment of the present invention.

FIG. 12 is a block diagram illustrating a femto base station in a broadband wireless communication system according to an exemplary embodiment of the present invention.

Referring to FIG. 12, the femto base station includes a transceiver 1200 and a controller 1210. More particularly, the controller 1210 includes a paging manager 1212.

The transceiver 1200 transmits/receives a signal to/from an MME, a macro base station, or a UE under control of the controller 1210. More particularly, according to an exemplary embodiment of the present invention, the transceiver 1200 receives a paging message from the MME to provide the received paging message to the controller 1210, transmits a paging message to a specific UE under control of the controller 1210, and receives a paging response message from the specific UE.

The controller 1210 controls and processes overall operations of the femto base station, and more particularly, includes the paging manager 1212 according to an exemplary embodiment of the present invention. Accordingly, when a paging message is received from an MME via the transceiver 1200, the controller 1210 manages paging for a relevant UE. That is, the paging manager 1212 transmits a paging message to the relevant UE, and determines whether a paging response message is received from the UE, or whether a message informing that the UE has accessed a macro base station is received from the MME or the macro base station. When a paging response message is received from the UE, the paging manger 1212 transmits a registration message to the MME to receive an incoming call, and sets up a connection with the UE to control and process a function for transmitting/receiving data. When a message informing that the UE has accessed the macro base station is received, the paging manager 1212 ends a paging procedure for the UE.

Figure 13:
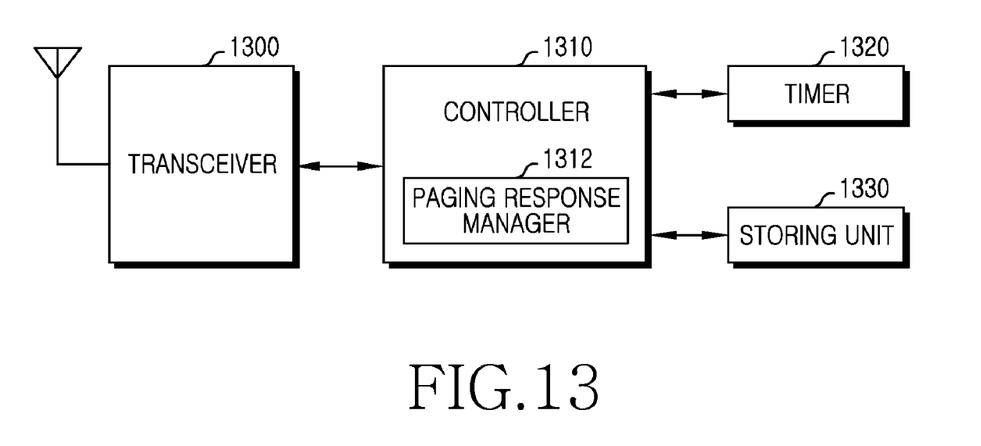
FIG. 13 is a block diagram illustrating a UE in a broadband wireless communication system according to an exemplary embodiment of the present invention.

FIG. 13 is a block diagram illustrating a UE in a broadband wireless communication system according to an exemplary embodiment of the present invention.

Referring to FIG. 13, the UE includes a transceiver 1300, a controller 1310, a timer 1320, and a storing unit 1330. More particularly, the controller 1310 includes a paging response manager 1312.

The transceiver 1300 transmits/receives a signal to/from a macro base station or a femto base station under control of the controller 1310. More particularly, according to an exemplary embodiment of the present invention, the transceiver 1300 receives a paging message from the macro base station or the femto base station to provide the received paging message to the controller 1310, and transmits a paging response message to one of the two base stations under control of the controller 1310.

The controller 1310 controls and processes an overall operation of the UE, and more particularly, includes the paging response manager 1312 according to an exemplary embodiment of the present invention. Accordingly, when a paging message is received from the macro base station, the UE starts the timer 1320 to measure time, and determines whether to respond to the paging message from the macro base station. That is, in response to the paging message from the macro base station, the paging response manager 1312 determines whether to access the macro base station, or whether to defer a paging response to the macro base station, wait for a paging message to be received from the femto base station, and determines whether to access the femto base station in response to the paging message from the femto base station. At this point, the paging response manager 1312 determines whether there exists a femto base station accessible by the UE inside the service area of the macro base station by comparing the TA and the CID of the macro base station with a fingerprint or footprint stored in the storing unit 1330 in advance. After that, when there does not exist an accessible femto base station, the paging response manager 1312 determines to access the macro base station. On the other hand, when there exists an accessible femto base station, the paging response manager 1312 determines to access the femto base station.

When determining to access the macro base station, the paging response manager 1312 transmits a paging response message to the macro base station and terminates the timer. On the other hand, when determining to access the femto base station, the paging response manager 1312 determines whether a paging message is received from the femto base station within a predefined first threshold time. When the paging message is received from the femto base station, the paging response manager 1312 transmits a paging response message to the femto base station. On the other hand, when the paging message is not received from the femto base station, the paging response manager 1312 controls and processes a function for transmitting a paging response message to the macro base station before a predefined second threshold time expires.

The timer 1320 starts its operation under control of the controller 1320 to measure the predefined first threshold time $T_f$ or second threshold time $T_{pg}$.

The storing unit 1330 stores various programs and data for overall operations of the UE, and stores a fingerprint or footprint denoting information of the macro base station including a set of femto base stations which the UE may access, that is, a CSG.

According to exemplary embodiments of the present invention, an idle UE which is located in the service area of a femto base station and which is camping on a macro base station in a broadband wireless communication system receives paging messages from the macro base station and the femto base station, and transmits a paging response message to one of the two base stations depending on circumstances. Therefore, even when the UE is camping on the macro base station, the UE may receive a paging message from the femto base station and immediately access the femto base station without performing a hand-in procedure to transmit/receive data. In addition, compared to a conventional art which performs the hand-in procedure, exemplary embodiments of the present invention may remarkably reduce a use amount of radio and network resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A paging method for User Equipment (UE) in a broadband wireless communication system, the method comprising:
   receiving a paging message from a macro base station;
   determining whether there exists an accessible femto base station inside a service area of the macro base station;
   when there does not exist the accessible femto base station inside the service area of the macro base station, responding to the paging message of the macro base station; and
   when there exists the accessible femto base station inside the service area of the macro base station, deferring a response to the paging message of the macro base station and waiting for a paging message to be received from the femto base station.

2. The method of claim 1, further comprising:
   when the paging message is received from the femto base station within a threshold time, responding to the paging message of the femto base station; and
   when the paging message is not received from the femto base station within the threshold time, responding to the paging message of the macro base station,
   wherein the threshold time is smaller than a time for which the macro base station waits for a paging response of the UE.

3. The method of claim 2, wherein the threshold time begins when the paging message is received from the macro base station.

4. The method of claim 2, wherein, when the paging message is not received from the femto base station within the threshold time, the responding to the paging message of the macro base station comprises responding to the paging message of the macro base station within the time for which the macro base station waits for the paging response of the UE.

5. The method of claim 1, wherein the determining of whether there exists the accessible femto base station inside the service area of the macro base station comprises:
receiving a message from the macro base station comprising a Tracking Area (TA) and a Connection IDentifier (CID) of the macro base station;
comparing the TA and the CID of the macro base station with information that corresponds to one or more femto base stations that may be accessed by the UE; and
determining if the accessible femto base station exists inside the service area of the macro base station based on a result of the comparison.

6. A paging apparatus for User Equipment (UE) in a broadband wireless communication system, the apparatus comprising:
a transceiver for receiving a paging message from a macro base station; and
a controller for, when there does not exist an accessible femto base station inside a service area of the macro base station, responding to the paging message of the macro base station, and when there exists the accessible femto base station inside the service area of the macro base station, deferring a response to the paging message of the macro base station and waiting for a paging message to be received from the femto base station.

7. The apparatus of claim 6, wherein the controller controls a function of responding to the paging message of the femto base station when the paging message is received from the femto base station within a threshold time, and responding to the paging message of the macro base station when the paging message is not received from the femto base station within the threshold time,
wherein the threshold time is smaller than a time for which the macro base station waits for a paging response of the UE.

8. The apparatus of claim 7, wherein the threshold time begins when the paging message is received from the macro base station.

9. The apparatus of claim 7, wherein, when the paging message is not received from the femto base station within the threshold time, the controller controls the function of responding to the paging message of the macro base station to occur within the time for which the macro base station waits for the paging response of the UE.

10. The apparatus of claim 6, wherein the controller determines whether there exists the accessible femto base station inside the service area of the macro base station by comparing a Tracking Area (TA) and a Connection IDentifier (CID) of the macro base station, which are received in a message from the macro base station, with information that corresponds to one or more femto base stations that may be accessed by the UE, and determining if the accessible femto base station exits inside the service area of the macro base station based on a result of the comparison.

* * * * *